US009062741B2

(12) United States Patent
Kurematsu et al.

(10) Patent No.: US 9,062,741 B2
(45) Date of Patent: Jun. 23, 2015

(54) RATCHET-TYPE TENSIONER

(75) Inventors: Yuji Kurematsu, Osaka (JP); Kaori Mori, Osaka (JP); Munehiro Maeda, Osaka (JP); Osamu Yoshida, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 522 days.

(21) Appl. No.: 13/409,592

(22) Filed: Mar. 1, 2012

(65) Prior Publication Data
US 2012/0244975 A1 Sep. 27, 2012

(30) Foreign Application Priority Data

Mar. 24, 2011 (JP) ................................. 2011-066431

(51) Int. Cl.
*F16H 7/08* (2006.01)

(52) U.S. Cl.
CPC ................ *F16H 7/0848* (2013.01); *F16H 7/08* (2013.01); *F16H 2007/0806* (2013.01); *F16H 2007/0812* (2013.01); *F16H 2007/0853* (2013.01); *F16H 2007/0859* (2013.01)

(58) Field of Classification Search
CPC ................ F16H 2007/0853; F16H 2007/0891; F16H 2007/0889; F16H 2007/0872; F16H 2007/087; F16H 2007/0865; F16H 2007/0863; F16H 2007/0851; F16H 2007/0848; F16H 2007/0812; F16H 2007/08; F16H 7/08; F16H 7/0848; F16H 7/10; F16H 7/12; F16H 7/1254; F16H 7/1263; F16H 7/1272
USPC ......... 474/101, 103, 104, 110, 111, 113, 136, 474/137, 138
See application file for complete search history.

(56) References Cited

U.S. PATENT DOCUMENTS

| 8,734,278 | B2* | 5/2014 | Ishii et al. ..................... 474/110 |
| 2005/0239589 | A1* | 10/2005 | Seungpyo et al. ............ 474/110 |
| 2007/0243961 | A1* | 10/2007 | Aimone ........................ 474/109 |
| 2012/0196709 | A1 | 8/2012 | Kurematsu |
| 2012/0225743 | A1 | 9/2012 | Ishii |

FOREIGN PATENT DOCUMENTS

JP        2559664        9/1997

OTHER PUBLICATIONS

Unpublished U.S. Appl. No. 13/474,792 for Ratchet-Type Tensioner.
Unpublished U.S. Appl. No. 13/477,345 for Ratchet-Type Tensioner.

* cited by examiner

*Primary Examiner* — Sang Kim
*Assistant Examiner* — Juan Campos, Jr.
(74) *Attorney, Agent, or Firm* — Howson & Howson LLP

(57) ABSTRACT

A ratchet-type tensioner, comprising: a housing; a plunger supported by the housing for movement in opposite advancing and setback directions, the plunger having rack teeth provided thereon, and being arranged to advance with respect to the housing along the advancing direction for applying tension to a traveling transmission medium engaged with rotating members; and a ratchet mechanism capable of restricting the plunger from setting back due to a reaction force acting in a setback direction from the transmission medium; said ratchet mechanism comprising: a ratchet-receiving hole provided within the housing; a ratchet element slidable in the ratchet-receiving hole and movable in a sliding direction transverse to the advancing and setback directions; ratchet teeth on the ratchet element engageable with the rack teeth of the plunger; and a ratchet-biasing means for biasing the ratchet element in an engaging direction along the sliding direction so that the ratchet teeth engage with the rack teeth; said ratchet mechanism being capable of restricting the plunger from being set back by a reaction force acting in a setback direction from the transmission medium; said rack teeth having a concave-convex form and being composed of stop surfaces facing in the setback direction and sliding surfaces facing in the advance direction, said sliding surfaces being inclined relative to the sliding direction and facing in a disengaging direction opposite from the engaging direction; each of said sliding surfaces having an entry starting location which the ratchet teeth first engage when starting to enter the rack teeth, and an entry ending location where the engagement of the ratchet teeth with the rack teeth ends; each said sliding surface being a curved surface, all of said curved surface, between said entry starting location and said entry ending location of said sliding surface, bulging in the advancing direction of the plunger and in the disengaging direction of the ratchet element from an imaginary reference plane intersecting said entry starting location and said entry ending location of said sliding surface and perpendicular to another imaginary plane to which the advancing and setback direction of the plunger and the sliding direction of the ratchet element are parallel; and at least a part of said curve midway along said curve between the entry starting location and the entry ending location is convex.

9 Claims, 10 Drawing Sheets

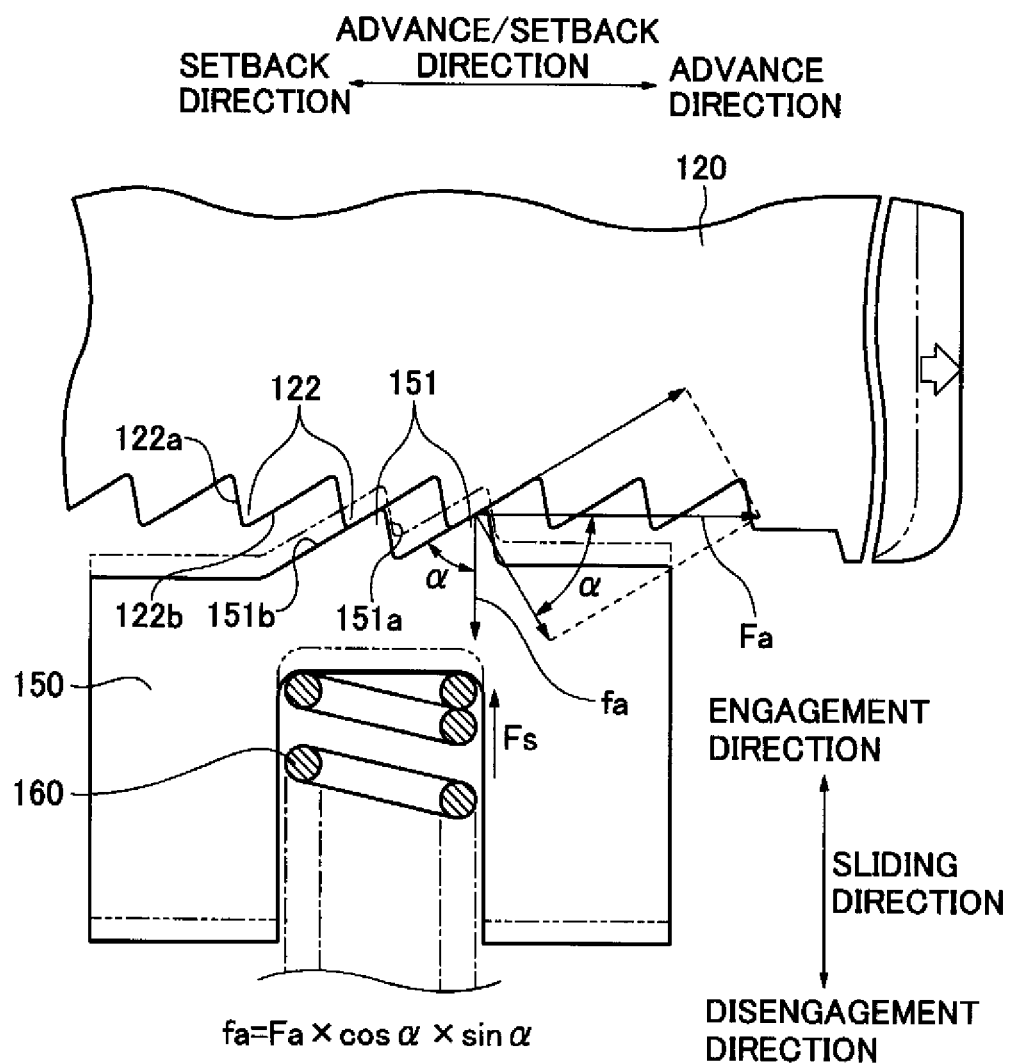

RATCHET-TYPE TENSIONER

CROSS REFERENCE TO RELATED APPLICATIONS

This application claims priority on the basis of Japanese Patent Application No. 2011-066431, filed on Mar. 24, 2011. The disclosure of Japanese Patent Application No. 2011-066431 is incorporated by reference.

FIELD OF THE INVENTION

The invention relates to a ratchet-type tensioner for applying tension to an endless, flexible, transmission medium such as a timing chain for driving one or more camshafts from the crankshaft of an internal combustion engine.

BACKGROUND OF THE INVENTION

A typical ratchet-type tensioner includes a plunger slidable in a plunger-accommodating hole in a tensioner housing. The plunger is movable along an advancing and setback direction, and is biased in its advancing, i.e., protruding, direction. The plunger either abuts a flexible transmission medium such as a timing chain directly, or applies tension to the transmission medium through a device such as a pivoted tensioner lever on which the transmission medium slides.

A typical prior art ratchet-type tensioner 500 is disclosed in Japanese Utility Model No. 2559664 and illustrated in FIG. 9. In the tensioner, a plunger 514 is slidable in a plunger-accommodating hole in a housing 512, and protrudes from the housing, being biased in the advancing direction by a spring 518 and by oil pressure within a chamber 516 formed by the plunger and the housing.

A piston 526 slides in the housing 512 in a direction orthogonal to the direction in which the plunger 514 slides. An oil sub-chamber 520 is formed by the piston 526 and the housing 512, and an oil passage 544 supplies oil under pressure to the oil sub-chamber 520, urging the piston away from the plunger 514. A spring 534 biases the piston 526 toward plunger, opposing the force exerted by the oil in sub-chamber 520. Spring 534 is located within an air chamber 528 on the side of piston 526 opposite from the sub-chamber 520. An air hole 532 in communication with the air chamber 528 is closable by a rod 524, to which the piston 526 is attached, when the piston 526 is moved away from the plunger against the biasing force exerted by spring 534 by hydraulic pressure in sub-chamber 520 and the piston 526 moves against a biasing force of the second spring 534.

A rack of teeth 538 is provided on plunger 514, and a plurality of teeth 536, capable of engaging the rack teeth 538, is provided at the end of rod 524 opposite form the end that is arranged to close off air hole 532. Surfaces of teeth 536 and 538 for blocking retraction of the plunger are formed at a right angle to the direction in which the plunger 514 moves.

FIG. 10 shows another known ratchet-type tensioner 550, having a plunger 551 movable within a housing and urged by a biasing force in the advance direction applied by a plunger-biasing spring and by oil within a high-pressure oil chamber (not shown) to apply tension to a chain. A ratchet mechanism 560, prevents the plunger 551 from being set back by a reaction force generated in the traveling chain in the setback direction. The ratchet mechanism 560 includes a ratchet element 561 received in the housing and slidable in a direction orthogonal to the advancing/setback direction of the plunger 551. Rack teeth 552 provided on the plunger 551 are engageable by ratchet teeth 562, and a ratchet-biasing spring 566 biases the ratchet element 561 in an engaging direction along the direction of sliding movement of the ratchet element so that the ratchet teeth 562 engage the rack teeth 552.

In the tensioner shown in FIG. 10, the maximum backlash corresponds to the pitch P5 of the rack teeth. Rattling noise is generated due to abutment of the rack teeth with the ratchet teeth as the plunger advances and sets back, and flapping of the chain also occurs, generating additional noise.

A greater backlash results in greater rattling and flapping noises. Reducing the inclination angle α5 of the sliding surfaces 553 of the rack teeth 552 as shown in FIG. 10 is one way to reduce backlash and resulting noises. However, if the inclination angle α5 is reduced, the pitch becomes smaller, as shown by the single dot broken lines in FIG. 10, where the pitch is reduced to pitch P5a. When the plunger advances, the frequency of abutment of the rack teeth 552a with ratchet teeth, which will then have a tooth shape corresponding to the rack teeth 552a, increases. However, due to increased friction between the rack teeth and the ratchet teeth, the plunger can no longer advance as quickly, and cannot follow variations in tension in the chain. Thus, the application of tension to the chain is retarded.

The inclination angle α5 can be reduced without decreasing of the pitch P5 of the rack teeth 552, by increasing the depth of the rack teeth 552b to a tooth depth H5b, as shown in FIG. 10 by two-dot broken lines. Increasing the tooth depth, however, generates other problems. Movement of the ratchet element in the sliding direction increases, and fluctuations in the ratchet biasing force exerted by the ratchet biasing spring 566 increase. The result is destabilization of the behavior of the plunger, and increase of the friction between the rack teeth 552b and ratchet teeth, which will then have a tooth shape corresponding to that of the rack teeth 552b.

When the plunger advances rapidly, the ratchet element, being driven by the advancing plunger also recedes rapidly in the disengaging direction. In such a case, after the ratchet teeth disengage the rack teeth, the start of the return movement of the ratchet element in the engaging direction can be retarded due to the inertia of the ratchet element. When inertial retardation of movement of the ratchet element occurs in a ratchet mechanism such as mechanism 560, having rack tooth stop surfaces 554 that are parallel to the sliding direction of the ratchet element, the ratchet teeth 562 can jump over the rack teeth 552, and may not engage with all of the rack teeth.

Furthermore, when the plunger sets back, it is possible that the ratchet teeth will ride over the rack teeth so that the plunger continues to set back, even beyond its backlash distance, depending on the relative magnitude of the chain reaction force and the plunger biasing force. In that case, the rattling noise generated when the ratchet teeth are abutted by the rack teeth increases, and the flapping noise of the chain also increases.

This excessive setting back of the plunger, as the ratchet teeth ride over the rack teeth, occurs on starting an engine when there is not enough hydraulic pressure in the high-pressure oil chamber to restricting setback of the plunger, i.e., when the advance-direction biasing force is too small. When oil in the high pressure oil chamber of the tensioner is supplied by the engine oil pump, low hydraulic pressure typically occurs as the result of infiltration of air into the high-pressure oil chamber while the engine has been stopped for an extended interval of time.

There is also a case in which the plunger advances excessively due to looseness or elongation of the chain resulting from fluctuation in tension, or thermal expansion of the engine block or of the chain caused by changes in the temperature of the engine. When the plunger protrudes excessively, the chain is ultimately placed under excessive tension. And, if the plunger is restricted from setting back due to the reaction force from the chain when the chain is under excessive tension, the chain travels under excessive load, and generates noise.

The invention aims at solving the above problems by providing a ratchet-type tensioner in which the plunger responds quickly to changes in tension, in which the durability of the ratchet mechanism is improved, and in which noise caused by backlash is reduced. The invention also aims at providing a ratchet-type tensioner in which the behavior of the plunger is stabilized. The responsiveness of the plunger, the durability of the ratchet mechanism, the reduction in backlash noise, and stabilization of the plunger behavior, are addressed by a novel shape of the sliding surfaces of the rack teeth of the ratchet mechanism.

The invention also aims at providing a ratchet-type tensioner that prevents ratchet teeth from jumping over the rack teeth due to inertial retardation of the ratchet element when the plunger advances.

Furthermore, the invention aims at providing a ratchet-type tensioner capable of reducing noise caused by the setback of the plunger, and of reducing the load in, and the noise generated by, the chain or other transmission medium when under excessive tension.

SUMMARY OF THE INVENTION

The ratchet-type tensioner of the invention comprises a housing, and a plunger formed with rack teeth and supported by the housing for movement in opposite advancing and setback directions. The plunger advances with respect to the housing along the advancing direction for applying tension to a traveling transmission medium engaged with rotating members. A ratchet mechanism is provided for restricting the plunger from setting back due to a reaction force acting in a setback direction from the transmission medium. The ratchet mechanism comprises a ratchet-receiving hole provided within the housing, a ratchet element slidable in the ratchet-receiving hole and movable in a sliding direction transverse to the advancing and setback directions, ratchet teeth on the ratchet element engageable with the rack teeth of the plunger, and a ratchet-biasing means for biasing the ratchet element in an engaging direction along the sliding direction so that the ratchet teeth engage with the rack teeth. The ratchet mechanism is capable of restricting the plunger from being set back by a reaction force acting in a setback direction from the transmission medium. The rack teeth have a concave-convex form and are composed of stop surfaces facing in the setback direction and sliding surfaces facing in the advance direction. The sliding surfaces are inclined relative to the sliding direction and face in a disengaging direction opposite from the engaging direction. Each of the sliding surfaces has an entry starting location which the ratchet teeth first engage when starting to enter the rack teeth, and an entry ending location where the engagement of the ratchet teeth with the rack teeth ends. The sliding surface is a curved surface the intersection of which with a reference plane to which the advancing and setback direction of the plunger and the sliding direction of the ratchet element are mutually parallel, is a curve bulging in the advancing direction of the plunger and in the disengaging direction of the ratchet element.

The bulge of the sliding surfaces of the rack teeth reduces the degree of backlash by reducing the distance between the stop surface and the sliding surface. Thus, it is possible to reduce rattling noise produced by the ratchet mechanism without reducing the pitch of the rack teeth excessively. Furthermore, because the flapping of the flexible transmission medium is suppressed, the flapping noises caused can also be reduced.

In addition, because it is not necessary to reduce the pitch excessively in order to reduce backlash, it is possible to prevent excessive friction between the rack teeth and the ratchet teeth, which would otherwise occur as the plunger moves in the advance/setback direction if the pitch were excessively small.

As a result, smooth advancing movement of the plunger is assured, and it is possible to improve the rapidity with which the plunger advances, and the ability of the plunger to follow oscillations of the transmission medium. Because the friction between the rack teeth and the ratchet teeth is not increased, it also is possible to improve the durability of the ratchet mechanism.

In another aspect of the invention, the inclination angle of the sliding surface, measured in relation to the sliding direction of the ratchet element, increases from the entry ending location toward the entry starting location.

As a result of the increase in the inclination angle, it is possible to reduce backlash, and to reduce the noise caused by the backlash, without excessively reducing the pitch of the rack teeth.

Because the inclination angle of the sliding surface increases toward the starting location, it is possible to avoid excessive increase of the tooth depth of the rack teeth, which would be necessary if the sliding surface were in the form of an inclined plane. As a result, it is possible to ensure stable behavior of the plunger by preventing increase in the movement of the ratchet element in the sliding direction caused by the rack teeth, without excessively increasing the pitch of the rack teeth.

Furthermore, because it is possible to avoid an excessive increase of the depth of the rack teeth by increasing the inclination angle of the part of the rack teeth adjacent the entry starting location, it is possible to prevent the increase of the fluctuations of the biasing force of the ratchet biasing spring that would otherwise accompany an increased range of movement of the ratchet element.

As a result, it is possible to ensure stable sliding behavior of the plunger. Because the biasing force exerted by ratchet biasing spring is not increased excessively, the load on the ratchet teeth, when riding over the rack teeth, is reduced compared to the case where the inclination angle of the sliding surface is constant. It also is possible to reduce or avoid a drop in the speed of advancing movement of the plunger that would otherwise be caused as the biasing force exerted on the ratchet element increases, and to improve the ability of the plunger to follow oscillation of the tension in the flexible transmission medium. It also is possible to prevent and increase in the friction between the rack teeth and the ratchet teeth, and to improve the durability of the ratchet mechanism.

Where the inclination angle increases, the sliding surface can be divided into an entry starting-side area and an entry ending-side area. In accordance with still another aspect of the invention, the entry starting-side area and the entry ending-side area meet each other at a bisecting line that bisects the distance from the entry starting location to the entry ending point along the sliding surface. The rate of increase of the inclination angle of the sliding surface, proceeding along the sliding surface in the direction from the entry ending location to the entry starting location, decreases when approaching the entry starting location within a region along the sliding surface extending from the starting location more than half way toward the bisecting line.

Because the rate of increase of the inclination angle is reduced adjacent the entry starting location, the surface of the rack tooth adjacent the entry end approaches a parallel relationship with the direction of advancing and setback movement of the plunger. As a result, when a ratchet tooth is in contact with the rack tooth surface adjacent the entry end, the speed of movement of the ratchet element in the disengaging direction due to protruding movement of the plunger becomes small. Therefore, the influence of the inertia of the ratchet element when starting to move in the engaging direction after disengagement of the ratchet teeth from the rack teeth becomes small.

Therefore it is possible to prevent the ratchet teeth from jumping the rack teeth even when the retardation of the start of the movement of the ratchet element in the engaging direction caused by the inertia occurs when the advance speed of the plunger is large. Then, the advance of the rack teeth by one tooth is assured, and it is possible to prevent the plunger from advancing excessively.

In still another aspect of the invention, the entry ending locations of the rack teeth are shaped to conform to parts of the ratchet teeth adjacent the tips thereof. The ratchet teeth then come into face-to-face relationship with the sliding surfaces of the rack teeth over an area extending from the entry ending location toward the entry starting location. Because the ratchet teeth are in face-to-face contact with the sliding surface adjacent the entry ending location, the suppression of movement of the plunger in the advancing direction is improved when the ratchet teeth are in contact with the rack teeth at the entry ending locations. As a result, it is possible to reduce backlash noise caused. In addition, because the contact pressure between the rack teeth and the ratchet teeth is reduced, it is possible to reduce friction.

Preferably, the stop surfaces of the rack teeth are inclined relative to the sliding direction and face in a disengaging direction opposite from the engaging direction. Here, the range of the stop surface in the advance/setback direction is larger than that of a rack tooth having no inclination. Therefore, it is possible to prevent the jumping of the rack teeth that occurs when the stop surfaces are not inclined, even when movement of the ratchet element is retarded due to its inertia.

Preferably, the ratchet mechanism restricts the plunger from setting back by engaging the ratchet teeth with the rack teeth when the reaction force is at a first level, generated when the tension in the traveling transmission medium is less than a predetermined excessive tension, but allows the plunger to set back by sliding of the ratchet element in a disengaging direction to disengage the ratchet teeth from the rack teeth when the reaction force is at a second, and greater, level, generated when the tension in the traveling transmission medium at least as great as the predetermined excessive tension. Here, the first reaction force is a reaction force generated on starting the engine, and the second reaction force is a reaction force, greater than the first reaction force, generated after starting of the engine. The ratchet biasing force is greater than a first component force in the sliding direction, generated from the first reaction force, but smaller than a second component force in the sliding direction, generated from the second reaction force. Accordingly, it is possible to reduce the noise of flapping the transmission medium by restricting movement of the plunger in the setback direction, thereby blocking setback displacement when the reaction force is at the first level.

The biasing force exerted by the plunger-biasing means can be just enough to cause the plunger to move in the advancing direction. No special plunger-biasing spring is required to accommodate a high load, and the tensioner can therefore be downsized, and the number of parts and its manufacturing cost can be reduced.

Because the biasing force of the ratchet-biasing spring is smaller than the second force component, in the direction of sliding of the ratchet element, generated by the reaction force that sets back the plunger when the tension in the transmission medium becomes excessive, the second force component acting on the teeth of the ratchet element when the tension is excessive enables the ratchet teeth to disengage the rack teeth on the plunger. The plunger is then set back until the biasing force of the ratchet biasing means becomes greater than the second force component. Consequently it is possible to prevent seizing of the plunger by allowing setback displacement without causing backlash due to excessive tension in the traveling transmission medium. It is also possible to achieve reliable prevention of seizing of the plunger by adjusting the biasing force exerted by the ratchet-biasing means, thereby controlling the timing of tooth disengagement when the transmission medium comes under excessive tension.

The rack teeth of the plunger are preferably concave and convex teeth formed by the stop surfaces and the sliding surfaces. The stop surfaces are inclined toward the advance direction and face in the disengaging direction, and the sliding surfaces are inclined toward the setback-direction and also face in the disengaging direction. The ratchet teeth are concave and convex teeth formed by stop counterface surfaces inclined toward the advancing direction when proceeding in the disengaging direction, and sliding counterface surfaces inclined toward the setback direction when proceeding in the disengaging direction. With this tooth structure, it is possible to prevent the jumping of the rack teeth that occurs in the case of rack teeth having stop surfaces that are not inclined, even when retardation of the movement of the ratchet element occurs due to its inertia.

When the second reaction force, that sets back the plunger when excessive tension is generated in the transmission medium, acts on the stop surfaces of the ratchet element, a component force acts on the stop counterface surfaces of the ratchet element, causing the ratchet element to slide so that its teeth disengage the rack teeth of the plunger. Then, the rack teeth of the plunger slide over the counterface surfaces, clearing the ratchet teeth with which they are engaged, allowing the plunger to set back by a distance corresponding to one tooth. Setback displacement takes place smoothly without restriction on the movement of the plunger in the setback direction, and wear and damage, such as chipping of the rack teeth and ratchet teeth, which would otherwise occur as a result of excessive tension, are prevented. Excessive impact on the ratchet-biasing spring is also avoided. The ratchet mechanism therefore exhibits excellent durability.

The inclination angle of the stop surface is preferably smaller than the inclination angle of the sliding surface, the inclination angles being measured relative to the sliding direction of the ratchet element. As a result, it is possible to block the plunger from setting back as a result of the first, lower level, reaction force, and thereby reduce noise caused by the setting back of the plunger.

The housing of the tensioner can be attached to an engine having sprockets or other rotating members. The plunger-biasing means can include oil supplied under pressure during operation of the engine to a high-pressure oil chamber formed within the housing. When the first reaction force urging the plunger in the setback direction is generated on starting the engine while the hydraulic pressure within the high-pressure oil chamber is not enough to sustain the first reaction force, the ratchet mechanism can block the setback of the plunger in starting the engine. However, when the second reaction force that sets back the plunger is generated when the tension becomes excessive during operation the engine, the ratchet mechanism allows setback of the plunger, so that it is possible to reduce the excessive tension quickly.

BRIEF DESCRIPTION OF DRAWINGS

FIG. 3 is a schematic diagram showing the engagement of rack teeth on the plunger with ratchet teeth when the plunger is advancing;

DETAILED DESCRIPTION OF THE PREFERRED EMBODIMENTS

Figure 1:
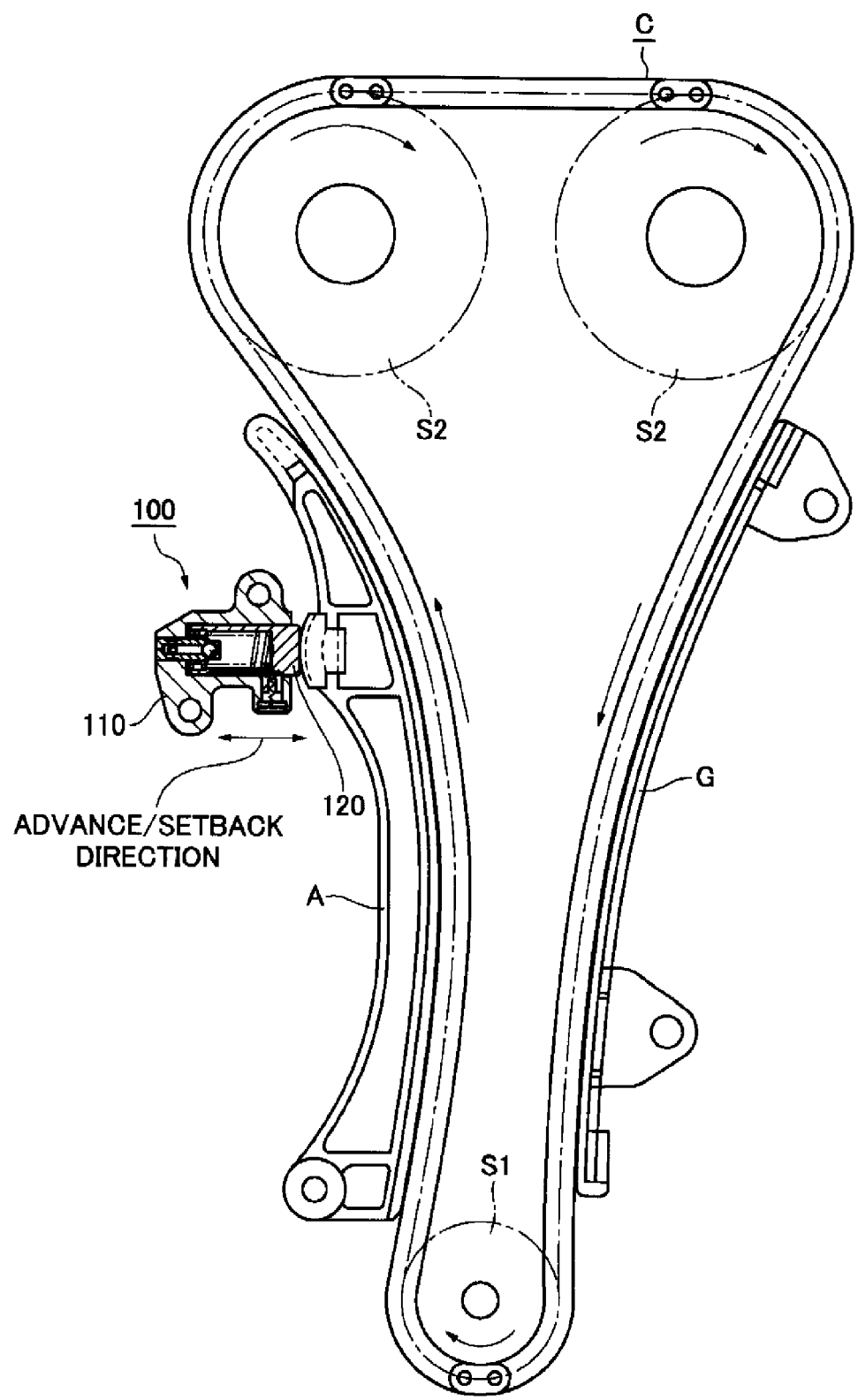
FIG. 1 is a schematic elevational view of an engine timing transmission incorporating of a ratchet-type tensioner in accordance with the invention.

As shown in FIG. 1, a ratchet-type tensioner 100 is attached to a machine, e.g., an engine not shown, on the slack side of an endless flexible traveling transmission medium in the form of an engine timing chain C. The timing chain is engaged with, and driven by a crankshaft sprocket S1, and engaged with and in driving relationship with a pair of camshaft sprockets S2.

The ratchet-type tensioner 100 comprises a housing 110, and a plunger 120 that projects out of the housing and is constrained by the housing for movement along an advance/setback direction. The plunger 120 applies tension to the slack side of the timing chain C, i.e., the side that travels from the crankshaft sprocket S1 toward one of the camshaft sprockets S2. The plunger applies tension to the chain through a lever A on which the slack side of the chain slides. The lever is pivoted on the engine block, and presses the plunger 120 at a location remote from the lever's pivot axis.

A stationary guide G for guiding the travel of the timing chain is attached to the engine body on the tension side of the timing chain C, i.e. the side of the chain that travels from the other of the camshaft sprockets S2 toward the crankshaft sprocket S1. Arrows indicate the direction of travel of the chain C and the direction of rotation of the sprockets.

Figure 2A:
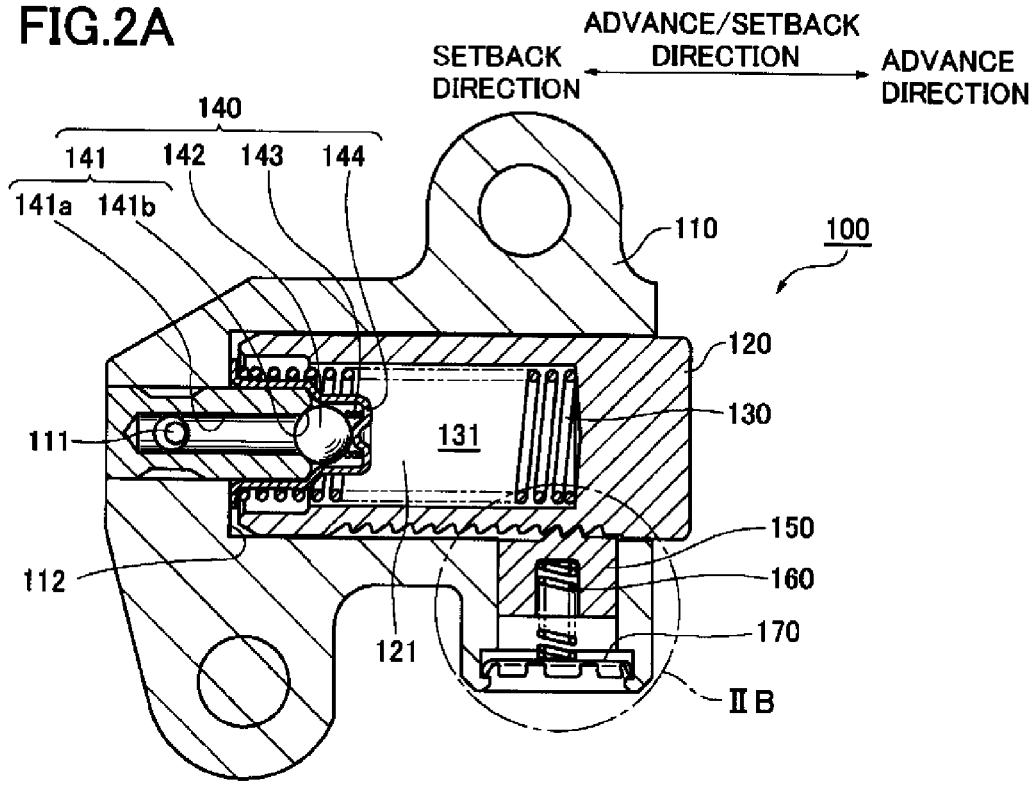
FIG. 2A is longitudinal cross-section of a ratchet-type tensioner according to the invention.

As shown in FIG. 2A, the tensioner 100 has an oil supply passage 111 for introducing oil supplied under pressure from an engine, a plunger-accommodating hole 112 for receiving the plunger 120, which is hollow, having an interior space 121 open at the end opposite from the protruding end. The column-shaped plunger 120 is reciprocable in the advance/setback direction, and advances out of the plunger-accommodating hole 112 to apply tension to the timing chain C as shown in FIG. 1. A high-pressure oil chamber 131 is formed by the plunger-accommodating hole 112 and the hollow interior space 121 of the plunger 120. A plunger-biasing spring 130 is disposed in the high-pressure oil chamber 131, and exerts a force biasing the plunger 120 in the advancing direction. A check valve 140 in the plunger-accommodating hole 112 blocks reverse flow of oil from the high-pressure oil chamber 131 to the oil supply path 111. A ratchet mechanism R (FIG. 2B), is provided for restricting setting back of the plunger 120 by the reaction force applied through the lever to the plunger by the timing chain C (see FIG. 1).

Oil, introduced into the high-pressure oil chamber 131 through the oil supply path 111, is typically supplied under pressure by an oil pump, which is activated by the engine and therefore operated only while the engine is operating.

In a hydraulic tensioner, the plunger-biasing spring 130 and the oil within the high-pressure oil chamber 131 together compose a plunger-biasing means that urges the plunger 120 in the advance direction.

The ratchet mechanism R includes hole 113 in housing 110 for receiving the ratchet element 150. The ratchet element 150 is slidable in a sliding direction in hole 113, and has a plurality of ratchet teeth 151. Rack teeth 122 are provided on a part of an outer circumferential surface of the plunger 120, and are engageable with the ratchet teeth 151. A ratchet-biasing spring 160 biases the ratchet element 150 in an engaging direction, i.e., a direction along the sliding direction to which the ratchet element 150 is constrained such that the ratchet teeth 151 engage the rack teeth 122. A spring retaining plug 170 is fitted in the ratchet receiving hole 113 for seating the ratchet-biasing spring 160.

Figure 4:
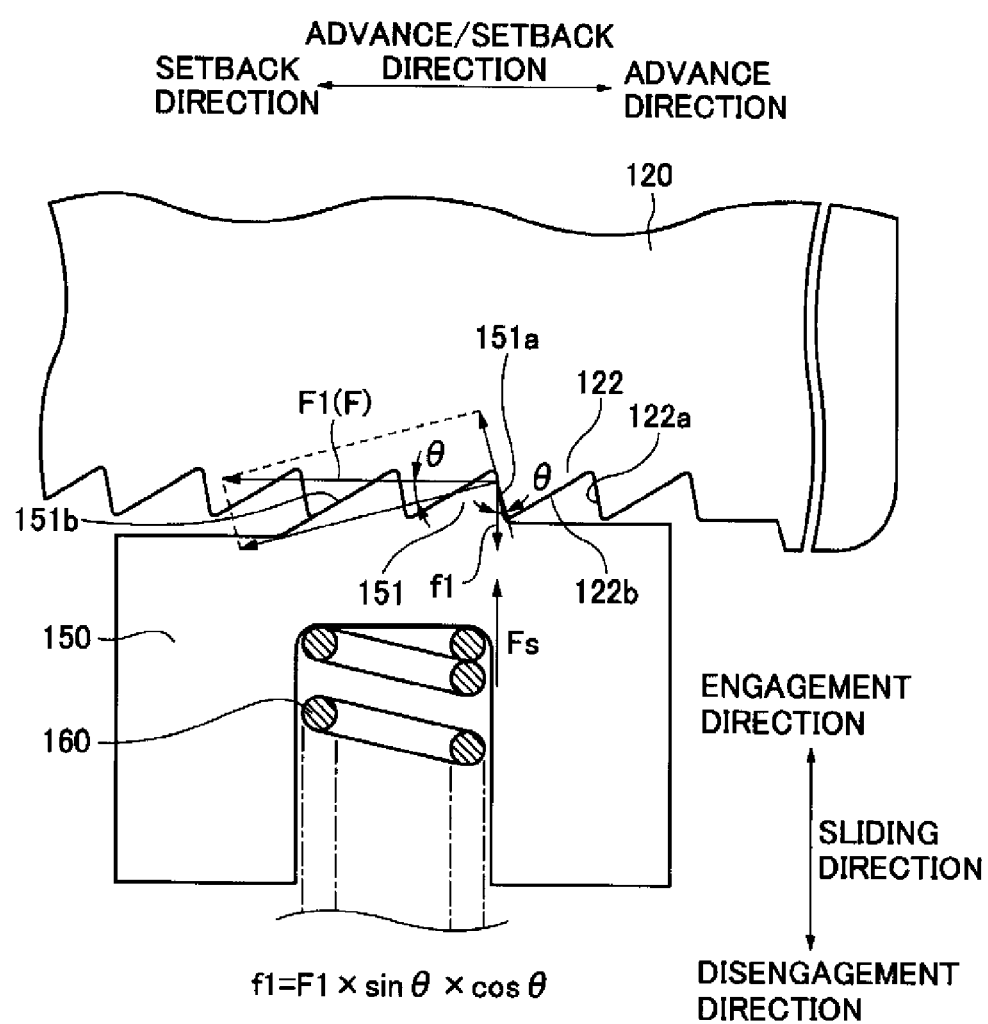
FIG. 4 is a schematic diagram showing the engagement of rack teeth on the plunger with ratchet teeth when the plunger is blocked from setting back on starting an engine.

The ratchet mechanism R has a backlash, the maximum amount of which corresponds to the pitch of the rack teeth 122. As shown in FIG. 4, the ratchet-biasing spring 160 exerts a biasing force Fs on the ratchet element that urges the ratchet teeth into engagement with the rack teeth on the plunger 120, thereby restricting setback of the plunger.

The ratchet element 150 that moves within the ratchet-receiving hole 113 comprises a column-shaped ratchet body 152 having an outer circumferential surface 153 (FIG. 2). The ratchet teeth 151 are disposed on the plunger-facing end of the ratchet element 150. The ratchet-receiving hole is configured so that the sliding direction of the ratchet element 150 is transverse to, and preferably orthogonal to, the advance/setback direction of the plunger 120. The central axes of the plunger and the ratchet element preferably intersect each other, and intersect at a right angle.

The engaging direction is the direction of movement of the ratchet element 150 when the ratchet element approaches the plunger 120, and the disengaging direction is the direction opposite the engaging direction, i.e., the direction in which the ratchet element 150 recedes from the plunger 120.

The term "plunger-side" refers to a position closer to the plunger 120 in the sliding direction, and the term "non-plunger-side" refers to positions farther from the plunger 120 in the sliding direction, i.e., the side opposite from the plunger-side.

The check valve 140 may be any known type of check valve. It is disposed at the setback direction end of the plunger-accommodating hole 112, allows oil to be introduced through the oil supply path 111 to the high-pressure oil chamber 131, and blocks the oil from flowing in the reverse direction from the high-pressure oil chamber 131 to the oil supply path 111.

In the embodiment shown in FIG. 2A, the check valve unit 140 has a ball seat 141 having an oil passage 141a communicating with the oil supply path 111 in the housing 110, a check ball 142 seated on a valve seat 141, a ball-biasing spring 143 for biasing the check ball 142 against the ball seat 141, and a bell-shaped retainer 144 for supporting the ball-biasing spring 143 and restricting movement of the check ball 142.

The ratchet biasing spring 160 extends into a spring-receiving hole 152a in the ratchet element 150, the axis of which extends along the direction in which the ratchet element slides.

The spring retaining plug 170 is in the form of a washer having a plural resilient tongues 171 projecting from its periphery. The tongues 171 fit into the non-plunger-side end of the ratchet receiving hole 113. The biasing force Fs exerted by the spring 160 (FIGS. 3-7) depends on the position of the spring retaining plug 170.

As shown in FIG. 3, the plunger 120 is moved in the advancing direction by an advancing force Fa due to the plunger-biasing spring 130 and the pressure of the oil within the high-pressure oil chamber 131 during starting and normal operation of the engine when the tension in the timing chain is not excessive. The biasing force Fs exerted by the ratchet-biasing spring 160 is set so that it is always smaller than the force component fa acting on the ratchet element 150 in the disengagement direction. Component fa is the component of the advancing force Fa acting in the disengagement direction as a result of the action of the rack teeth 122 on the ratchet teeth 151 as shown in FIG. 3.

When the component force fa surpasses the resultant of the biasing force Fs and the sliding direction component of the frictional force acting between the rack teeth 122 and the ratchet teeth 151, the plunger 120 advances, following the lever A (FIG. 1) while pushing the ratchet element 150 in the disengagement direction. FIG. 3 shows, in two-dot chain lines, the positions of the front end of the plunger 120 and the ratchet element 150 before the plunger 120 advances.

Referring to FIG. 4, when the reaction force F exerted by the timing chain through the lever in the setback direction has a first magnitude F1, a first force component f1 acts in the disengagement direction on the ratchet element by the action of the rack teeth 122 on the ratchet teeth 151. The ratchet biasing force Fs is set so that it is greater than the magnitude of component f1. Here, the first reaction force F1 is the reaction force exerted on the plunger either on starting the engine when the hydraulic pressure in the high-pressure oil chamber 131 is low, or while the engine is operating normally without excessive tension in the timing chain.

The condition in which the hydraulic pressure is low occurs when there is not enough hydraulic pressure in the high-pressure oil chamber 131 to counteract the first reaction force F1 and thereby restrict setback of the plunger 120. This condition can occur as a result of infiltration of air into the oil chamber 131 while no oil is supplied under pressure to the oil chamber 131, for example while the engine is inoperative for an extended interval of time.

When the first reaction force F1 urges the plunger 120 in the setback direction on starting the engine or during normal engine operation, the biasing force Fs plus the frictional force is greater than the first component force f1 acting on the ratchet element 150. Consequently, the engagement of the ratchet teeth 151 with the rack teeth 122, restricts movement of the plunger 120 and blocks setback displacement of the plunger 120 limiting the setback displacement of the plunger to its backlash.

Figure 5:
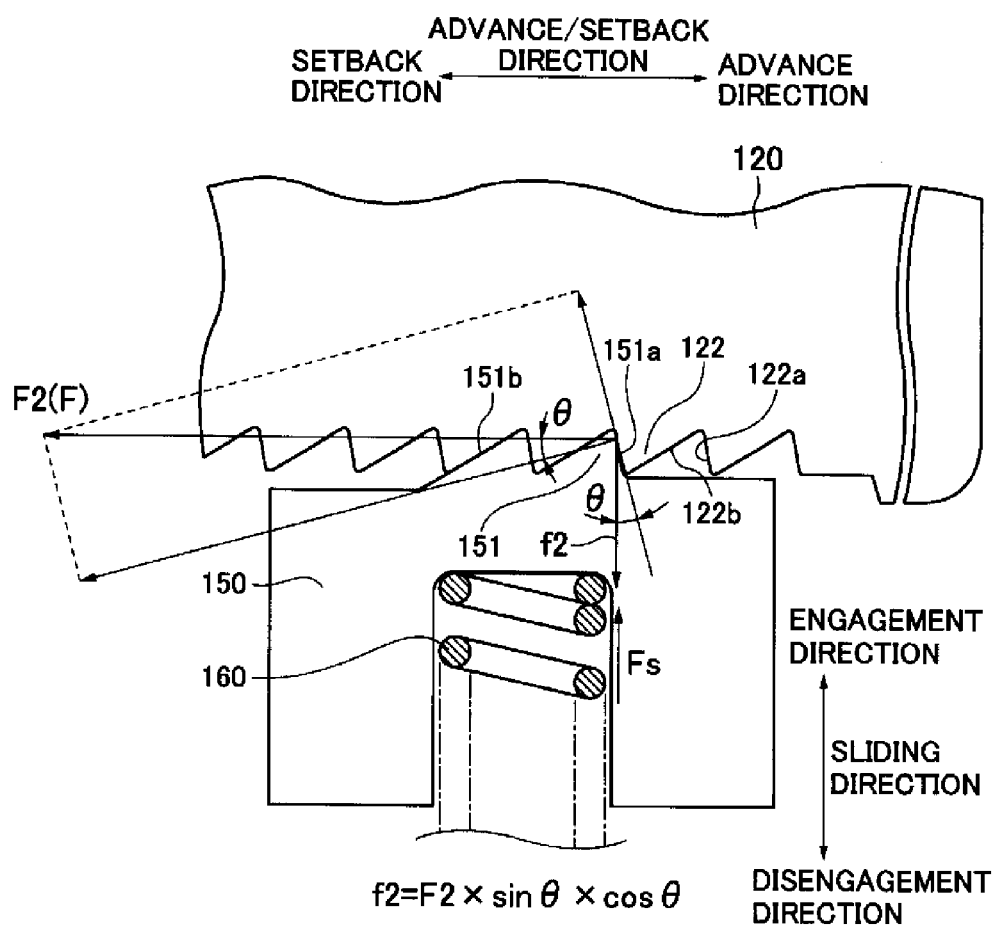
FIG. 5 is a schematic diagram showing the engagement of rack teeth on the plunger with ratchet teeth as the plunger begins to set back when tension in a timing chain becomes excessive.

When the magnitude of the reaction force F is at a high level, the reaction force is a second reaction force F2, as shown in FIG. 5, and a second component force f2 acts on the ratchet element 150 in the disengagement direction, through engagement of the rack teeth with the ratchet teeth. The biasing force Fs is set so that it is smaller than the second component force f2.

The reaction force F can reach the magnitude F2 when excessive tension is generated in the timing chain C. This excessive tension can occur, for example, after the plunger 120 has advanced excessively due to elongation of the timing chain, or as a result of other causes such as fluctuations in the tension of the timing chain C due to thermal expansion of the engine, the timing chain C, or both, due to temperature changes in the engine.

In summary, the first reaction force F1 is a reaction force that is exerted on the plunger when the timing chain tension is smaller than an excessive tension, and the second reaction force F2 is a force having a magnitude greater than the first reaction force F1.

Figure 6:
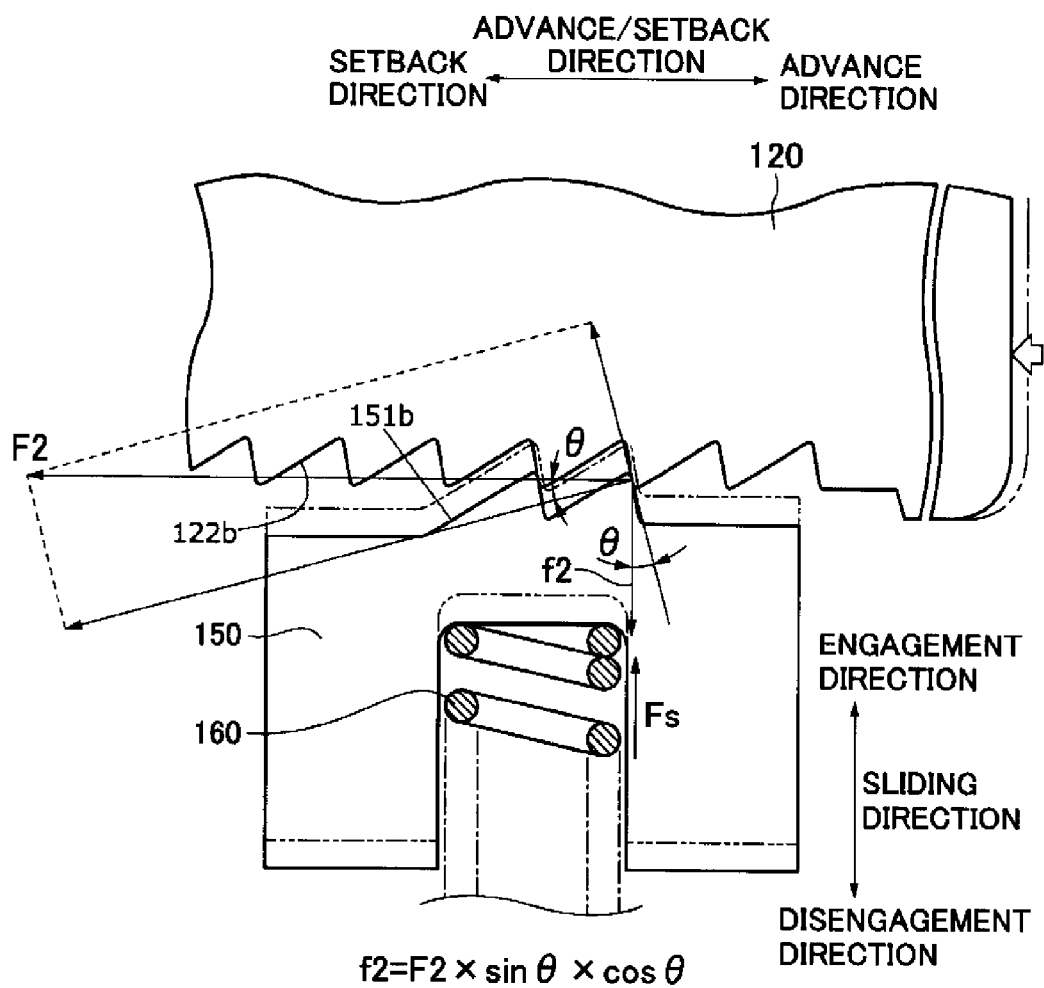
FIG. 6 is a schematic diagram showing the engagement of rack teeth on the plunger with ratchet teeth as the plunger continues to set back while the tension in the timing chain is excessive.
Figure 7:
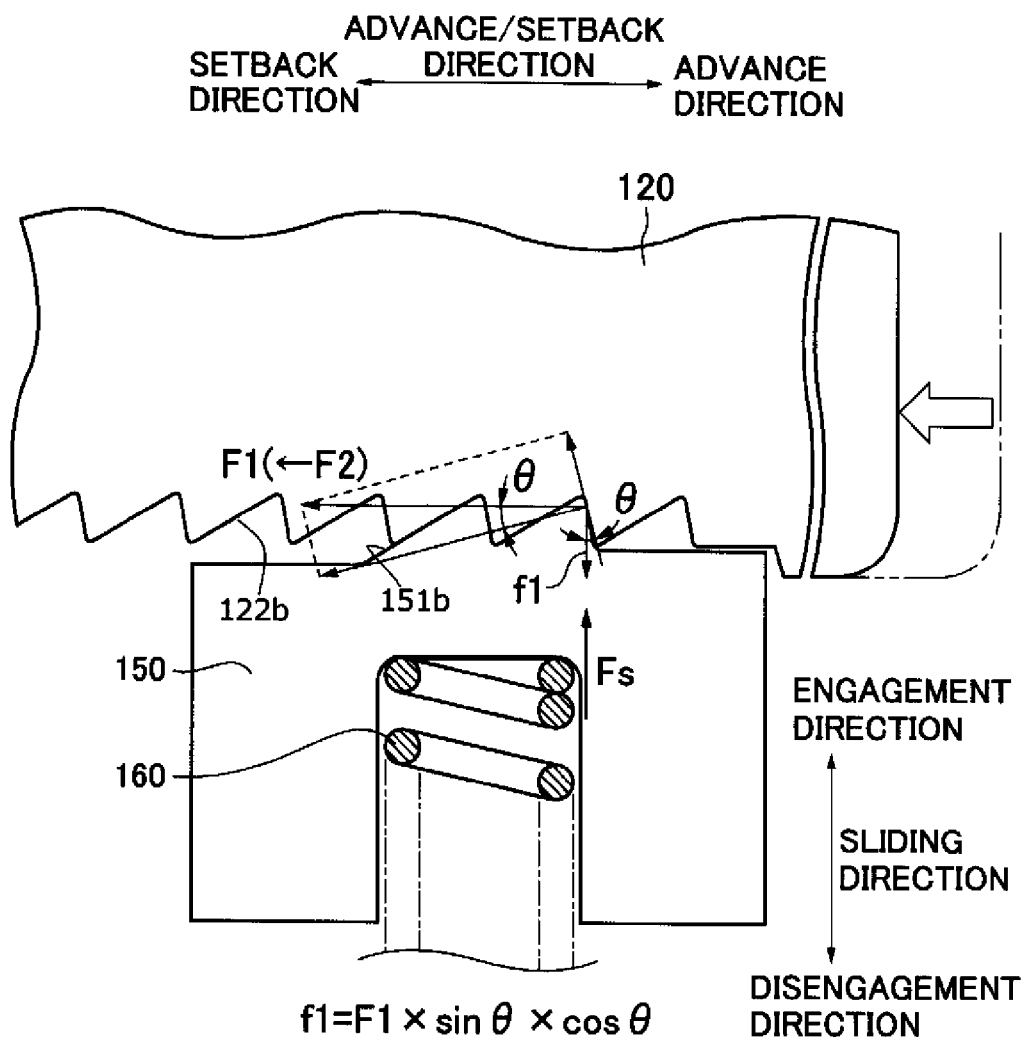
FIG. 7 is a schematic diagram showing the engagement of rack teeth on the plunger with ratchet teeth after the ratchet teeth disengage the rack teeth with which they were previously engaged in FIGS. 5 and 6 and engage rack teeth adjacent the rack teeth with which they were previously engaged.

When the second reaction force F2 is exerted on the plunger when the tension in the timing chain C becomes excessive after the engine is started, the second component force f2 becomes greater than the resultant of the biasing force Fs and the frictional force. As shown in FIG. 6, the ratchet element 150 slides in the disengagement direction, and the ratchet teeth 151 disengage the rack teeth 122. Then, the plunger 120 sets back by a distance corresponding to one tooth or several teeth of the rack teeth 122 until the reaction force F returns to the first reaction force F1, and the first component force f1 acts on the ratchet element 150 as shown in FIG. 7. Thus, when the tension of the timing chain C becomes excessive, the tensioner 100 does not restrict movement of the plunger 120 in the setback direction, and allows setback displacement beyond the setback permitted by backlash.

Figure 8:
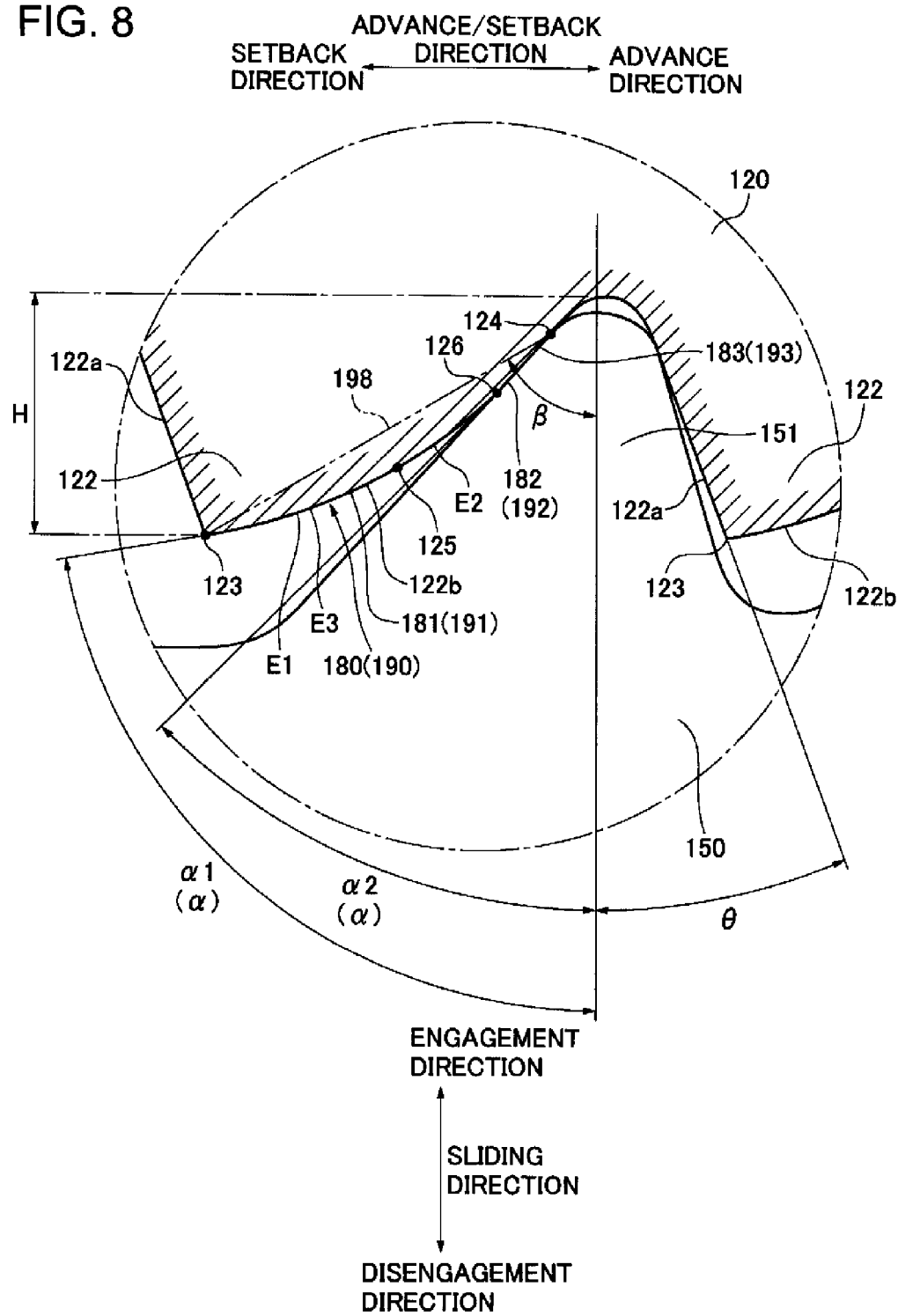
FIG. 8 is an enlarged schematic view showing details of the engagement of the rack teeth and the ratchet teeth shown in FIG. 2.
Figure 9:
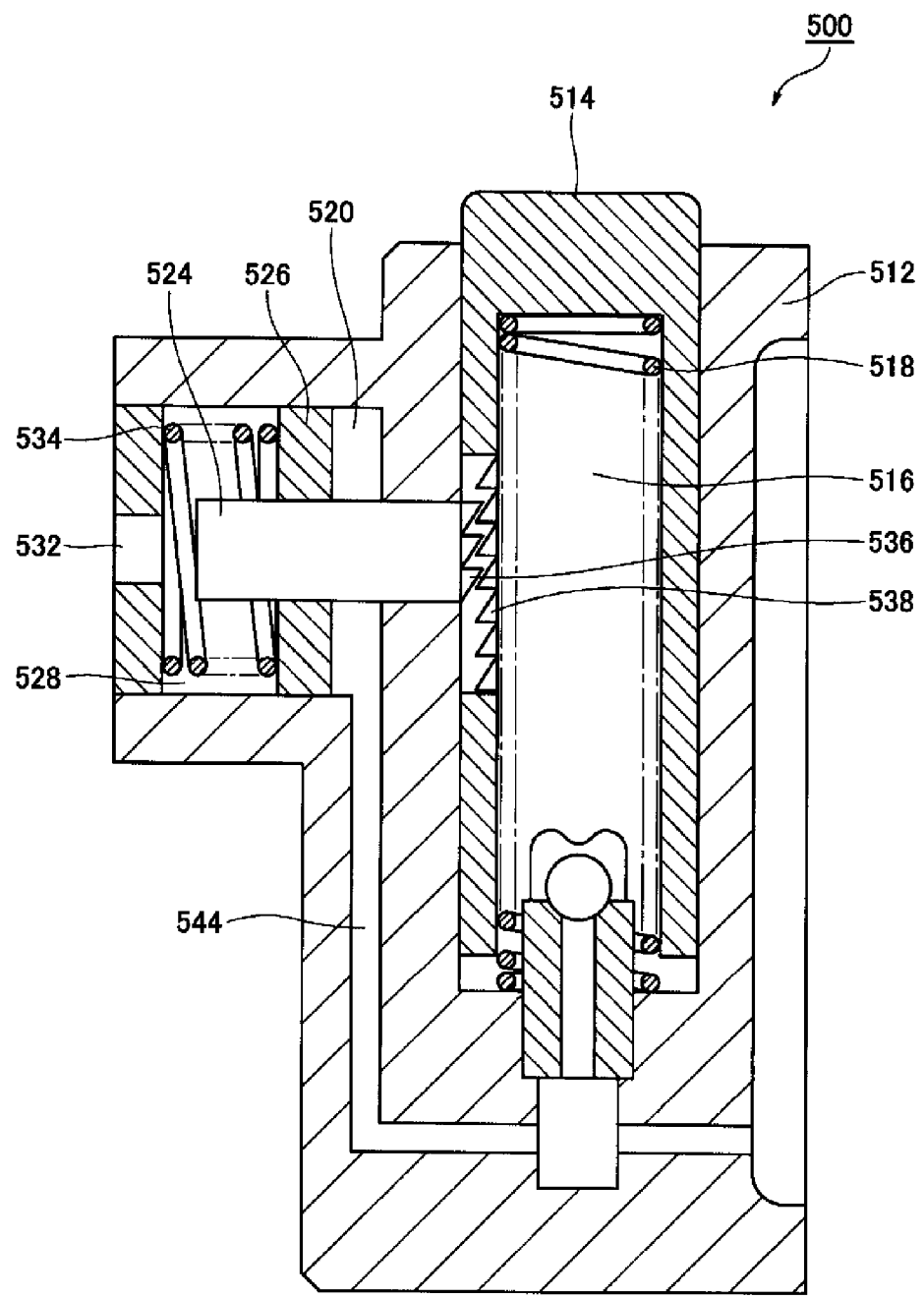
FIG. 9 is a cross-sectional view of a prior art tensioner.
Figure 10:
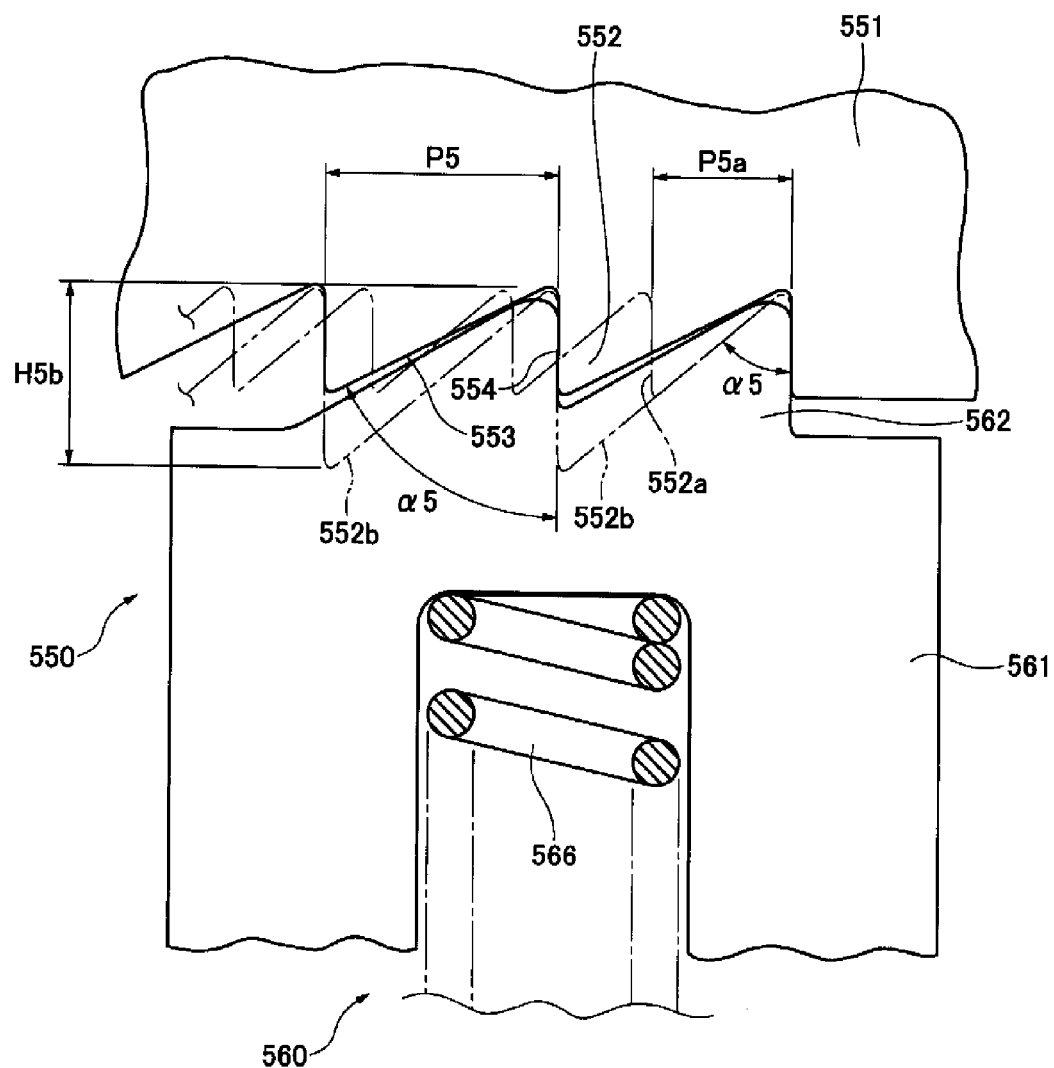
FIG. 10 is a schematic view showing tooth engagement details in another prior art tensioner.

The biasing force exerted by the plunger-biasing spring 130 in the advancing direction (FIG. 2A) can be greater than the biasing force Fs exerted by the ratchet-biasing spring 160. By adjusting the biasing force Fs within the range described above. It is possible to adjust the condition under which disengagement of the ratchet teeth from the rack teeth is caused by excessive tension in the chain after starting of the engine As shown in FIGS. 3 through 5, in the tensioner 100, the rack teeth 122 are concave/convex in form, having stop surfaces 122a, which are inclined toward the advance direction when proceeding in the disengagement direction of the ratchet element 150, and sliding surfaces 122b, which are inclined toward the setback direction, proceeding in the disengagement direction of the ratchet element 150. The stop surface 122a is planar, but the sliding surface 122b is a curved surface 180, as shown in FIG. 8.

The ratchet teeth 151 are similarly concave/convex in form, having stop counterface surfaces 151a, which are inclined toward the advance direction when proceeding in the direction of disengagement of the ratchet element 150, and sliding counterface surfaces 151b, which are inclined toward the setback direction when proceeding in the direction of disengagement the ratchet element 150.

Figure 2B:
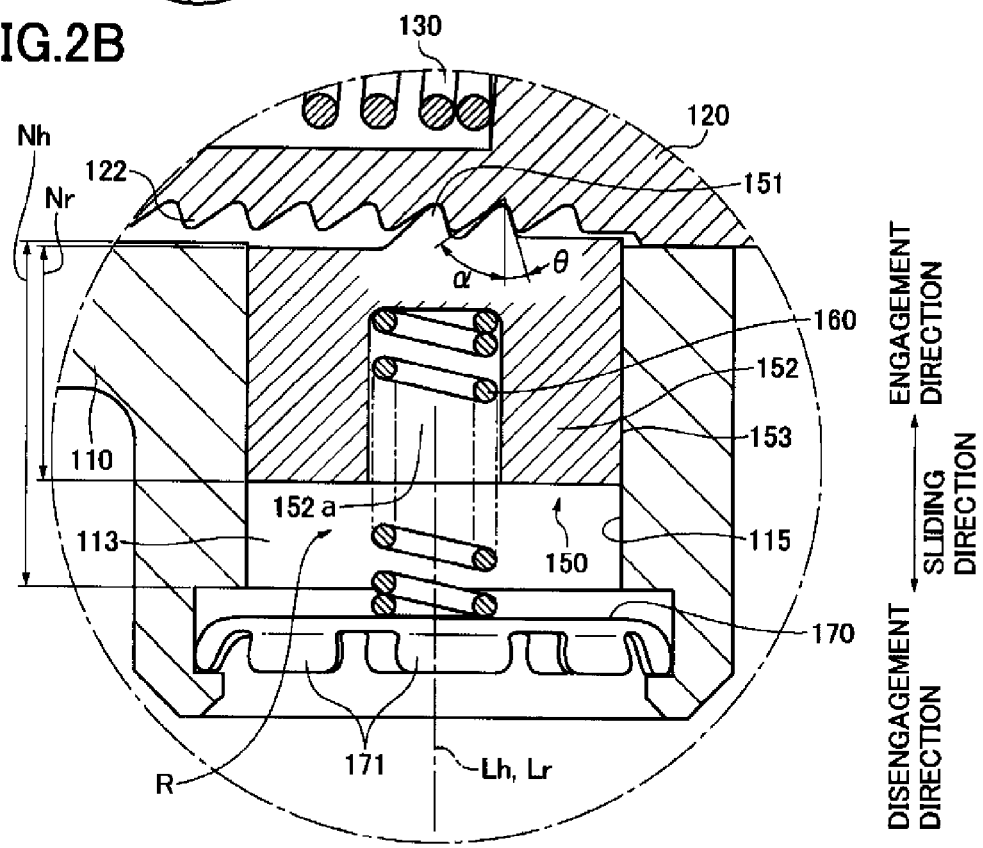
FIG. 2B is an enlarged auxiliary view of a part of the tensioner surrounded by a broken line circle in FIG. 2A.

As shown in FIG. 2B, the inclination angle θ of the stop surfaces 122a is smaller than the inclination angle α of the sliding surfaces 122b. For instance, the inclination angle θ is preferably 30° or less, and the inclination angle α greater than the inclination angle θ, but less than 90°. The inclination angles θ and α are angles measured from a line extending parallel to the sliding direction and lines tangent to the tooth surfaces, all said lines being in a common plane to which the advance/setback direction of the plunger and the sliding direction of the ratchet element are mutually parallel.

The inclination angle θ is determined by experiment and simulation so that disengagement of the rack teeth 122 and the ratchet teeth 151 and setback of the plunger 120 are blocked when the first reaction force F1 acts on the plunger 120, but to disengagement of the rack teeth 122 and the ratchet teeth 151 and setback of the plunger 120 are allowed when the second reaction force F2 acts on the plunger 120. In contrast to a conventional rack, in which the stop surfaces are not inclined, the rack teeth of the plunger in the invention can have a range of inclination angles θ.

The inclination angle α is similarly determined by experiments and simulations so that disengagement of the rack teeth 122 and the ratchet teeth 151, and advancing movement of the plunger 120 can take place when an advancing force Fa (FIG. 3) acts on the plunger 120.

When the plunger 120 advances to apply tension to the timing chain C during operation of the engine as shown in FIG. 3, the relationship of the magnitudes of the component force fa in the sliding direction generated by the advancing force Fa acting on the plunger 120, and the biasing force Fs of the ratchet element 150 is:

$$fa = Fa \times \cos\alpha \times \sin\alpha$$

$$fa > Fs$$

When setback of the plunger 120 is blocked on starting the engine, for example as shown in FIG. 4, the relationship of the magnitudes of the first component force f1 in the sliding direction generated by the first reaction force F1 exerted on the plunger 120 by the timing chain on starting the engine, and the biasing force Fs of the ratchet element 150, is:

$$f1 = F1 \times \cos\theta \times \sin\theta$$

$$f1 < Fs$$

When the plunger 120 advances excessively due to a temperature change in the engine, as shown in FIG. 5, the timing chain can be under excessive tension, and setback of the plunger 120 is allowed. Here, the relationship of magnitudes of the second component force f2 generated by the second reaction force F2 exerted on the plunger 120 by the timing chain, and the biasing force Fs, is:

$$f2 = F2 \times \cos\theta \times \sin\theta$$

$$f2 \leq Fs$$

When the second reaction force F2 is exerted on the plunger by the timing chain when the tension in the timing chain C is excessive, this second reaction force acts on the stop counterface surfaces 151a through the stop surfaces 122a to produce a second component force f2 in the disengagement direction along the direction of sliding movement of the ratchet element. The second component force overcomes the ratchet-biasing force and friction, and causes the ratchet teeth 151 to disengage the rack teeth 122. Then, as shown in FIGS. 6 and 7, the rack teeth return by a distance corresponding to one or more teeth, sliding on slide counterface surfaces, and engaging stop counterface surfaces.

Referring now to FIGS. 2B and 8, the ratchet mechanism R has a maximum backlash corresponding to the pitch of the rack teeth 122 (FIG. 3). The sliding surface 122b of the rack teeth 122 is contacted by the ratchet teeth 151 when the ratchet element 150 moves in the engaging direction and the ratchet teeth 151 enter the concavities of the rack teeth 122. As shown in FIG. 8, each of the sliding surfaces 122b has an entry starting location 123 at which a ratchet tooth 151 starts to enter the space between rack teeth, and an entry ending location 124 where the entry of the ratchet tooth 151 ends. In a region extending along the rack tooth sliding surface 122b from the entry starting location 123, the ratchet tooth 151 starts to move on the sliding surface 122b as the ratchet element moves in the engaging direction.

When the ratchet tooth reaches the entry ending location 124 the ratchet element 150 is located at its maximum projecting position in the engaging direction, i.e. the positions shown in FIGS. 2B, 4 and 5. The entry ending location 124 is the location along the range of contact between the ratchet tooth and the rack tooth farthest from the entry starting location 123.

The sliding surface 122b is composed of a convex curved surface 180 between the entry starting location 123 and the entry ending location 124. Convex curved surface 180 bulges toward both the advance and disengagement directions. The intersection of the sliding surface 122b with a reference plane, to which the advance/setback direction and the sliding direction are mutually parallel, is a convex curved line 190, bulging both in the advance and disengaging directions between the entry starting location 123 and the entry ending location 124.

The curved surface 180, can be divided into an entry starting area E1 and an entry ending area E2 meeting at a boundary 125 that bisects the distance from the entry starting location 123 to the entry ending location 124, measured along the curved line 190 in the reference plane. In the embodiment shown in FIG. 8, the sliding surface 122b is composed of a first curved surface 181 (shown as a first curved line 191) that extends from the entry starting area E1 to a part of the entry ending area E2 by crossing boundary 125, and a second curved surface 182 (shown as a second curved line 192) that is continuous with the first curved surface 181.

Proceeding from the entry starting location 123 toward the entry ending location 124, the first curved surface 181 gradually takes the form of a circular cylinder, i.e. a curve having a constant radius. The first curved surface then merges with the second curved surface 182 at a location beyond the central boundary 125, and the second curved surface 182 gradually takes the form of a plane 183 (shown as a straight line 192 in FIG. 8) that contains the entry ending location 124. Accordingly, at the entry ending location 124, the ratchet tooth 151 is in face-to-face engagement, i.e., in surface contact, with the rack tooth 122.

The second curved line 192 becomes a straight line at a boundary 126 between the first curved surface 181 and the second curved surface 182, and is tangent to the first curved line 191 which is a circular arc at the location of boundary 126. The boundary 126 is located in the entry ending area E2.

In the design of the sliding surface 122b the length of the first curved surface 181, can be increased by moving the boundary 126 toward the entry ending location 124. Thus, the length of the region within which the inclination angle α increases can be increased, making it easy to moderate the speed at which the ratchet element 150 moves in the disengaging direction. By moderating the speed of the ratchet element, its inertial movement in the disengagement direction can be retarded.

Angle α1, which is the inclination angle α at the entry starting location 123, is the maximum inclination angle of the sliding surface 122*b*, and greater than angle α2 at the entry ending location 124, which is the minimum inclination angle.

The inclination angle α in the entry starting-side area E1 is greater than a first predetermined angle, e.g., 50°, but less than 90°. The entry inclination angle α1 is greater than 70°, and greater than 80° in the embodiment shown. The inclination angle α in the entry ending area E2 is less than the first predetermined angle described above.

The ending inclination angle α2 is smaller than an angle β between the sliding direction and an imaginary straight line 198 passing through the entry starting location 123 and the entry ending location 124 in the reference plane. The starting inclination angle α1 is greater than angle β. As is apparent from FIG. 8, because the sliding surface 122*b* is defined by a curve bulging in the advance/setback direction and in the disengagement direction, the distance between the stop surface 122*a* and the sliding surface 122*b* in the advance/setback direction along the entry starting area E1 and the entry ending area E2 is smaller than it would be if the sliding surface 122*b* were a straight surface conforming to imaginary straight line 198. Accordingly, the amount of backlash is reduced.

The inclination angle α increases continuously from the boundary 126, through the central boundary 125, to the entry starting location 123 and reaches a maximum at the entry starting location 123.

The rate of increase of the inclination angle α decreases approaching the entry starting location 123 throughout a predetermined area E3, which is an area of surface 180 extending from the entry starting location to a location more than half way to the central boundary 125 between areas E1 and E2. In the embodiment shown in FIG. 8, the predetermined area E3 is the entire the entry starting area E1.

FIGS. 6 and 7 show, by two-dot chain lines, positions of the front end of the plunger 120 and the ratchet element 150 when the timing chain is under excessive tension after starting the engine.

When the second reaction force F2 that sets back the plunger 120 is exerted on the plunger by the timing chain due to excessive chain tension, the second component force f2 acts in the disengagement direction along the sliding direction of the ratchet element, as shown in FIG. 6. The plunger 120 starts to set back as the stop surfaces 122*a* slide over the stop counterface surfaces 151*a*.

As the plunger 120 sets back, the ratchet element 150 slides in the disengagement direction. It is constrained against tilting relative to the sliding direction by the ratchet-receiving hole, but is also prevented from contacting opposite sides of the ratchet-receiving hole by abutting contact between the tips of the rack teeth and the top surface of the ratchet element within a range of sliding movement of the ratchet element. Upon further movement of the ratchet member in the disengagement direction, the rack teeth 122 of the plunger 120 disengage the ratchet teeth 151 of the ratchet element 150. The ratchet element 150, being biased by the ratchet-biasing spring 160, then starts to move in the engagement direction, and the sliding surfaces 122*b* begin to slide move on the sliding counterface surfaces 151*b*.

As the plunger 120 continues to set back, the stop surface 122*a* of a next succeeding rack tooth 122 abuts the stop counterface surface 151*a*, as shown in FIG. 7. If the large second reaction force F2 is still acting on the plunger 120, the plunger 120 continues to set back in the manner described above.

When the plunger 120 sets back by one rack tooth or by several rack teeth, the excessive projection of the plunger 120 is eliminated, and the excessive chain tension caused by fluctuations in tension in the timing chain C or temperature changes in the engine can also be eliminated As mentioned previously, the bulge in the sliding surface 122*b* reduces backlash of the plunger. Moreover, the backlash is reduced without excessively reducing the pitch of the rack teeth 122. Rattling of the ratchet mechanism R caused by backlash is also reduced, and the flapping noise of the timing chain is suppressed.

Because it is not necessary to reduce the rack tooth pitch excessively in order to reduce the amount of backlash, it also is possible to prevent the excessive friction between the rack teeth 122 and the ratchet teeth 151 that would be encountered in moving the plunger in the advance/setback direction if the pitch of the rack tooth were made too small. As a result, smooth advance of the plunger 120 is achieved, and it is possible to improve the rapidity with which the plunger 120 advances and the responsiveness of the plunger 120 to oscillations in tension in the timing chain. Reduction in friction between the rack teeth 122 and the ratchet teeth 151 also improves the durability of the ratchet mechanism R and the overall durability of the ratchet tensioner 100.

Because the inclination angle α of the sliding surface 122*b* increases from the entry ending location 124 toward the entry starting location 123 but is small in the region closer to the entry ending location 124, it is possible to reduce the amount of backlash and to reduce the noise caused by the backlash while maintaining an adequate rack tooth pitch.

Because the inclination angle α of the sliding surface 122*b* increases closer to the entry starting location 123, it is possible to make the tooth depth of the rack teeth 122 smaller for a given tooth pitch than the tooth depth required when the sliding surface 122*b* has a constant inclination angle. It also is possible to achieve stable behavior of the plunger 120 by avoiding increased movement of the ratchet element 150 in the sliding direction while maintaining a given rack tooth pitch.

Furthermore, because it is possible to keep the tooth depth H of the rack teeth 122 small by increasing the inclination angle α in the area adjacent the entry starting location 123, it is possible to prevent the excessive fluctuation of the biasing force Fs exerted by the ratchet-biasing spring 160 that would occur if the displacement of the ratchet element 150 were larger. As a result, it is possible to assure the stability of the behavior of the sliding plunger 120.

Because the increase of the biasing force Fs is suppressed, the load on the ratchet teeth 151 as they ride over the rack teeth 122 is also reduced compared to the case where the inclination angle of the sliding surfaces 122*b* is constant. It is possible to suppress the reduction in the advancing speed of the plunger that would otherwise be caused by an increase in the biasing force Fs, and to improve the ability of the plunger 120 to follow oscillations of the timing chain. It is also possible to avoid excessive friction between the rack teeth 122 and the ratchet teeth 151, and to improve the durability of the ratchet mechanism R.

The rate of increase of the inclination angle α is reduced, approaching the entry starting location 123, throughout at least the portion of starting area E1 extending from the starting location to a location more than half the distance from the starting location 123 to the boundary 125 where areas E1 and E2 meet, and preferably throughout the entire starting area E1.

With this arrangement, because the rate of increase of the inclination angle α is reduced as approaching the entry starting portion 123 until reaching the entry starting portion 123, the moving speed of the ratchet element 150 moving in the disengaging direction due to the advancing plunger 120 become small. Therefore, an influence of the inertia of the ratchet element 150 on starting to move in the engaging direction after disengaging the ratchet teeth 151 from the rack teeth 122 becomes small.

As a result, it becomes possible to prevent the ratchet teeth 151 from jumping the rack teeth 122 even when the retardation of the start of the move of the ratchet element 150 in the engaging direction caused by the inertia occurs when the advance speed of the plunger 120 is large. Then, the advance of the rack teeth 122 per tooth is assured and it becomes possible to prevent the plunger 120 from advancing excessively.

Because the ratchet tooth 151 is in face-to-face contact with the sliding surface 122b at the entry ending location 124, it is possible to improve suppression of plunger movement in the advance/setback direction when the ratchet teeth 151 are fully engaged with the rack teeth 122. As a result, backlash noises are reduced. In addition, the pressure of the contact between the rack teeth 122 and the ratchet teeth 151 is reduced, and it is possible to reduce the friction between the rack teeth and the ratchet teeth.

Furthermore, because the stop surface 122a is inclined toward the advance direction proceeding in the disengagement direction, the stop surfaces can be disposed at any angle within a range of angles, whereas there is no range of angles in the case of a rack tooth whose stop surface is not inclined. With inclined stop surfaces, it is possible to prevent the jumping of the rack teeth that occurs in ratchet mechanisms having stop surfaces that are not inclined, even when the movement of the ratchet element is retarded due to its inertia.

The plunger is urged in the advancing direction by the plunger-biasing spring and by the hydraulic pressure of the oil within the high-pressure oil chamber. The biasing force Fs of the ratchet-biasing spring 160 is set to be greater than the first component force f1 in the sliding direction of the ratchet element 150, generated on starting the engine, but smaller than the second component force f2 in the sliding direction of the ratchet element 150, generated when the tension of the timing chain becomes excessive after starting the engine.

With this arrangement, it becomes possible to reduce the rattling noise of the rack teeth 122 and the ratchet teeth 151 and the flapping noise of the timing chain C by suppressing the setback displacement of the plunger 120 on starting the engine in the low hydraulic pressure state in which the hydraulic pressure within the high-pressure oil chamber 131 is insufficient to sustain the first reaction force F1. It is also possible to reduce the load and noise of the timing chain C and to prevent seizure of the plunger 120 otherwise caused by the excessive tension by allowing the setback displacement of the plunger 120 when the tension of the timing chain C is excessive after starting the engine. Still more, because it becomes possible to control timing of the disengagement caused by the excessive tension by adjusting the biasing force Fs, it becomes possible to securely prevent the seizure of the plunger 120. It is also possible to prevent the seizure of the plunger 120 by quickly reducing the excessive tension. Furthermore, because this arrangement allows the setback of the plunger 120 when the tension is excessive, it requires no special plunger biasing spring to accommodate a high-load, orifice mechanism nor oil reserving mechanism and allows the ratchet-type tensioner itself to be downsized by reducing the number of its parts and its production costs.

The rack teeth 122 of the plunger 120 are concave/convex teeth formed by the stop surfaces 122a inclined toward the advance direction proceeding in the disengagement direction, and sliding surfaces 122b inclined toward the setback direction proceeding in the disengaging direction. The ratchet teeth 151 are similarly concave/convex in form, having stop counterface surfaces 151a, which are inclined toward the advance direction when proceeding in the direction of disengagement of the ratchet element 150, and sliding counterface surfaces 151b, which are inclined toward the setback direction when proceeding in the direction of disengagement the ratchet element 150. The inclination angle θ of the stop surface 122a is smaller than the inclination angle α of the sliding surface 122b.

With this arrangement, because it becomes possible to block the rack teeth 122 from disengaging from the ratchet teeth 151 even when the first reaction force F1 that sets back the plunger 120 is generated, it becomes possible block the setback of the plunger 120. In contrary, when the second reaction force F2 that sets back the plunger 120 when the tension is excessive is generated, the second reaction force F2 acts on the stop counterface surface 151a of the ratchet teeth 151 as a component force through the stop surface 122a of the rack teeth 122 and the component force acting on the stop counterface surface 151a acts further as a small component force f2 in the sliding direction of the ratchet element 150 so as to disengage the ratchet teeth 151 from the rack teeth 122. Thus, the plunger 120 returns by one tooth as the rack teeth 122 slide over the slide counterface surface 151b through the stop counterface surface 151a. Thus, it becomes possible to achieve smooth setback displacement without restricting the movement of the plunger in the setback direction, while preventing wear and damage such as chipping of the teeth that would otherwise occur in the ratchet teeth and the rack teeth when the tension of the timing chain becomes excessive after starting the engine, and to achieve superior durability by avoiding excessive impact on the ratchet-biasing spring 160.

In a modified embodiment, the entire area of the sliding surface 122b between the entry starting location 123 and the entry ending location 124 can be a curved surface. In this case, the inclination angle α increases continuously in the range from the entry ending location 124 to the entry starting location 123.

In another modified embodiment, the first curved surface 181 can be formed only in the entry starting area E1, and the planar part of the second surface 182 can extend from the entry ending area E2 into the starting area E1, beyond boundary 125.

In still another modification, the second curved surface 182 can be a curved surface containing the entry ending location 124 and whose line of intersection with the reference plane is a circular arc having a curvature different from that of the line of intersection of the first curved surface 181 with the reference plane. Alternatively, the second curved surface can be a complex curved surface including a straight surface and a curved surface.

The curvature of the first curved surface 181 can be a complex curve whose line of intersection with the reference plane is composed of a plurality of circular arcs having different radii of curvature.

The first curved surface 181 can also be a surface composed of a series of planes, whose line of intersection with the reference plane consists of a plurality of straight lines having different inclination angles α. In this case, the inclination angles α increase stepwise from the boundary 126 toward the entry starting location 123. Accordingly, the configuration in which the inclination angles α increase stepwise from the boundary portion 126 toward the entry starting location 123 includes configurations having areas in which the inclination angle α does not change locally. The boundary 126 can be located in the entry starting area E1, and in this case, backlash can be greatly reduced.

Although in the embodiments described above the inclination angle θ is determined with the objectives of allowing setback of the plunger 120 when the tension in the timing chain becomes excessive, and preventing jumping of the rack teeth, alternatively the angle θ may be determined only by taking into account the objective of preventing jumping of the rack teeth.

If the objective is to reduce only backlash noise, the stop surface 122a of the rack teeth 122 can be in the form of a plane that is not inclined, that is, a plane whose intersection with the reference plane is a line parallel to the sliding direction.

The ratchet element 150 does not need to be slidable in a ratchet-receiving hole, and can be guided for movement in the sliding direction by other guiding means, for example a guide shaft.

The advance/setback direction and the sliding direction can be a in a transverse relationship other than orthogonal. The transmission medium, which in the embodiment described is an engine timing chain, can be a chain or a belt other than a timing chain and can be utilized in a power transmission in various kinds of machines other than engines.

What is claimed is:

1. A ratchet-type tensioner, comprising:
a housing;
a plunger supported by the housing for movement in opposite advancing and setback directions, the plunger having rack teeth provided thereon, and being arranged to advance with respect to the housing along the advancing direction for applying tension to a traveling transmission medium engaged with rotating members; and
a ratchet mechanism capable of restricting the plunger from setting back due to a reaction force acting in a setback direction from the transmission medium;
said ratchet mechanism comprising:
a ratchet-receiving hole provided within the housing;
a ratchet element slidable in the ratchet-receiving hole and movable in a sliding direction transverse to the advancing and setback directions;
ratchet teeth on the ratchet element engageable with the rack teeth of the plunger; and
a ratchet-biasing means for biasing the ratchet element in an engaging direction along the sliding direction so that the ratchet teeth engage with the rack teeth;
said ratchet mechanism being capable of restricting the plunger from being set back by a reaction force acting in a setback direction from the transmission medium;
said rack teeth having a concave-convex form and being composed of stop surfaces facing in the setback direction and sliding surfaces facing in the advance direction, said sliding surfaces being inclined relative to the sliding direction and facing in a disengaging direction opposite from the engaging direction;
each of said sliding surfaces having an entry starting location which the ratchet teeth first engage when starting to enter the rack teeth, and an entry ending location where the engagement of the ratchet teeth with the rack teeth ends;
each said sliding surface being a curved surface, all of said curved surface, between said entry starting location and said entry ending location of said sliding surface, bulging in the advancing direction of the plunger and in the disengaging direction of the ratchet element from an imaginary reference plane intersecting said entry starting location and said entry ending location of said sliding surface and perpendicular to another imaginary plane to which the advancing and setback direction of the plunger and the sliding direction of the ratchet element are parallel; and
at least a part of said curve midway along said curve between the entry starting location and the entry ending location is convex.

2. The ratchet-type tensioner according to claim 1, wherein said sliding surface has an inclination angle, measured relative to the sliding direction of the ratchet element, and wherein said inclination angle increases continuously, proceeding at least from the entry ending location toward the entry starting location in the part of the curve from said boundary to said entry starting location.

3. The ratchet-type tensioner according to claim 2 wherein said sliding surface is divided into an entry starting-side area and an entry ending-side area, the entry starting-side area and the entry ending-side area meeting each other at a bisecting line that bisects the distance from the entry starting location to the entry ending point along said sliding surface, and in which the rate of increase of the inclination angle of the sliding surface, proceeding along the sliding surface in the direction from the entry ending location to the entry starting location, decreases approaching the entry starting location within a region along said sliding surface extending from the starting location more than half way toward the bisecting line.

4. The ratchet-type tensioner according to claim 1, wherein said entry ending location of the sliding surface of each of said rack teeth is shaped to conform to portions of each of said ratchet teeth adjacent the tip thereof, whereby each of the ratchet teeth comes into face-to-face contact with a sliding of a rack tooth over an area extending from the entry ending location of the sliding surface of the last-mentioned rack tooth toward the entry starting location thereof.

5. The ratchet-type tensioner according to claim 1, wherein the stop surfaces are inclined relative to the sliding direction and face in a disengaging direction opposite from the engaging direction.

6. The ratchet-type tensioner according to claim 1, wherein the ratchet mechanism restricts the plunger from setting back by engaging the ratchet teeth with the rack teeth when the reaction force is a first reaction force generated when the tension in the traveling transmission medium is less than a predetermined excessive tension, but allows the plunger to set back by sliding of the ratchet element in a disengaging direction to disengage the ratchet teeth from the rack teeth when the reaction force is a second reaction force generated when the tension in the traveling transmission medium at least as great as said predetermined excessive tension, the ratchet biasing force being greater than a first component force in the sliding direction, generated from said first reaction force, but smaller than a second component force in the sliding direction, generated from said second reaction force.

7. The ratchet-type tensioner according to claim 6, wherein the rack teeth of the plunger are concave and convex teeth formed by said stop surfaces and said sliding surfaces, the stop surfaces being inclined toward the advance direction and facing in the disengaging direction, and the sliding surfaces being inclined toward the setback-direction and also facing in the disengaging direction, and wherein the ratchet teeth of the ratchet element are concave and convex teeth formed by stop counterface surfaces inclined toward the advance direction when proceeding in the disengaging direction, and sliding counterface surfaces inclined toward the setback direction when proceeding in the disengaging direction.

8. The ratchet-type tensioner according to claim 7, wherein each said sliding surface has a range of inclination angles measured relative to the sliding direction of the ratchet element, said inclination angles of each said sliding surface having a minimum value, and each of said stop surfaces of the rack teeth has an inclination angle, also measured relative to the sliding direction of the ratchet element, the inclination angles of said stop surfaces having a maximum value, and wherein the maximum value of the inclination angles of said stop surfaces is smaller than the minimum value of the inclination angle of each of said sliding surfaces.

9. The ratchet-type tensioner according to claim 1, wherein the housing is attached to an engine having rotating members, wherein the tensioner includes a plunger biasing means for urging the plunger in said advancing direction, and wherein the plunger biasing means includes oil supplied under pressure during operation of the engine to a high-pressure oil chamber formed within the housing.

\* \* \* \* \*